United States Patent
del Toro Reyna et al.

(10) Patent No.: US 10,793,178 B1
(45) Date of Patent: Oct. 6, 2020

(54) STEERING WHEEL ASSEMBLY

(71) Applicant: Ford Global Technologies, LLC, Dearborn, MI (US)

(72) Inventors: Alan Efren del Toro Reyna, Texcoco (MX); Gustavo Morales cabrera, Ecatepec de Morelos (MX); Huberto Essaud Archundia Hernández, Toluca (MX); Srinivas Reddy Malapati, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/751,642

(22) Filed: Jan. 24, 2020

(51) Int. Cl.
  *B62D 1/11* (2006.01)
  *B60R 21/203* (2006.01)
  *F15B 15/19* (2006.01)

(52) U.S. Cl.
  CPC .............. *B62D 1/11* (2013.01); *B60R 21/203* (2013.01); *F15B 15/19* (2013.01)

(58) Field of Classification Search
  CPC .......... B62D 1/11; B60R 21/203; F15B 15/19
  See application file for complete search history.

(56) References Cited

U.S. PATENT DOCUMENTS

| | | | |
|---|---|---|---|
| 4,962,947 | A | 10/1990 | Nagata et al. |
| 6,065,366 | A | 5/2000 | Koyama et al. |
| 7,338,382 | B2 | 3/2008 | Yamada |
| 7,441,799 | B2 | 10/2008 | Enders et al. |
| 8,079,615 | B2 | 12/2011 | Tanaka |
| 8,500,156 | B2 | 8/2013 | Banno et al. |
| 8,555,745 | B2 | 10/2013 | Inoue |
| 9,096,257 | B1 * | 8/2015 | Faruque et al. |
| 9,205,798 | B1 | 12/2015 | Jundal et al. |
| 9,834,121 | B2 | 12/2017 | Riefe |
| 9,945,323 | B1 * | 4/2018 | Henck |
| 10,246,118 | B2 | 4/2019 | Baumeister et al. |
| 2002/0014076 | A1 * | 2/2002 | Blackburn et al. |
| 2010/0307152 | A1 * | 12/2010 | Mayer et al. |
| 2017/0174171 | A1 * | 6/2017 | Dennis et al. |

FOREIGN PATENT DOCUMENTS

EP      3342649 B1   11/2019
GB      1446698 A  *  8/1976

* cited by examiner

*Primary Examiner* — Vicky A Johnson
(74) *Attorney, Agent, or Firm* — Frank A. MacKenzie; Bejin Bieneman PLC

(57) ABSTRACT

An assembly includes a steering wheel having a first member and a second member supported by the first member, the second member being extendable from the first member from a first position to an extended position. The assembly includes a cylinder in the first member. The assembly includes a piston slidably supported by the cylinder. The assembly includes a pyrotechnic in communication with the cylinder.

20 Claims, 8 Drawing Sheets

STEERING WHEEL ASSEMBLY

BACKGROUND

A vehicle typically includes a steering wheel. The steering wheel provides an interface for a driver of the vehicle to control a steering angle of the vehicle by transmitting rotation of the steering wheel to movement of a steering rack.

A driver airbag is typically supported by the steering wheel. The airbag is deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1A:
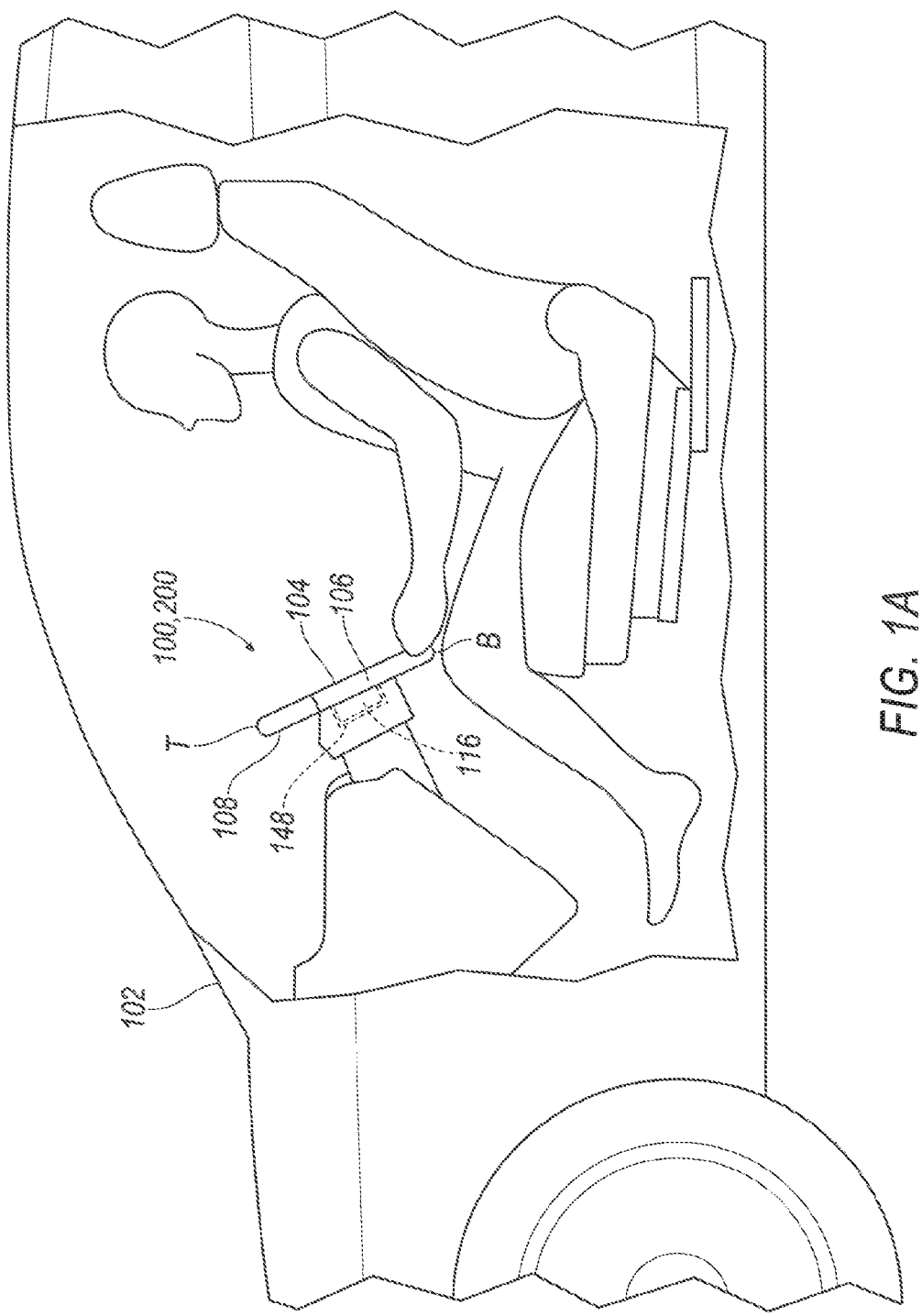
FIG. 1A is a side view of a vehicle having a steering wheel supporting an airbag.
Figure 1B:
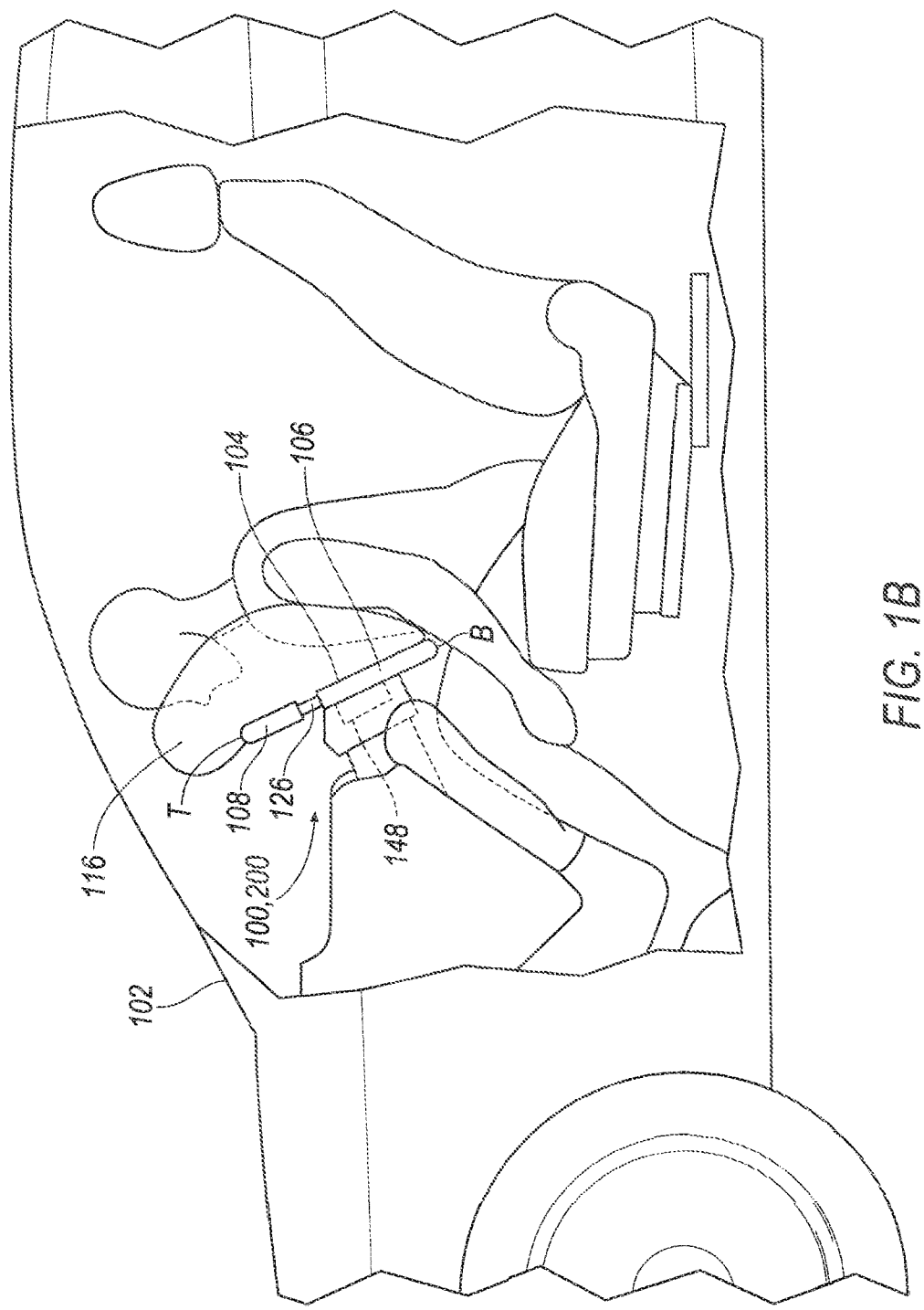
FIG. 1B is a side view of the vehicle having the steering wheel in an extended position supporting the airbag in an inflated position.
Figure 2A:
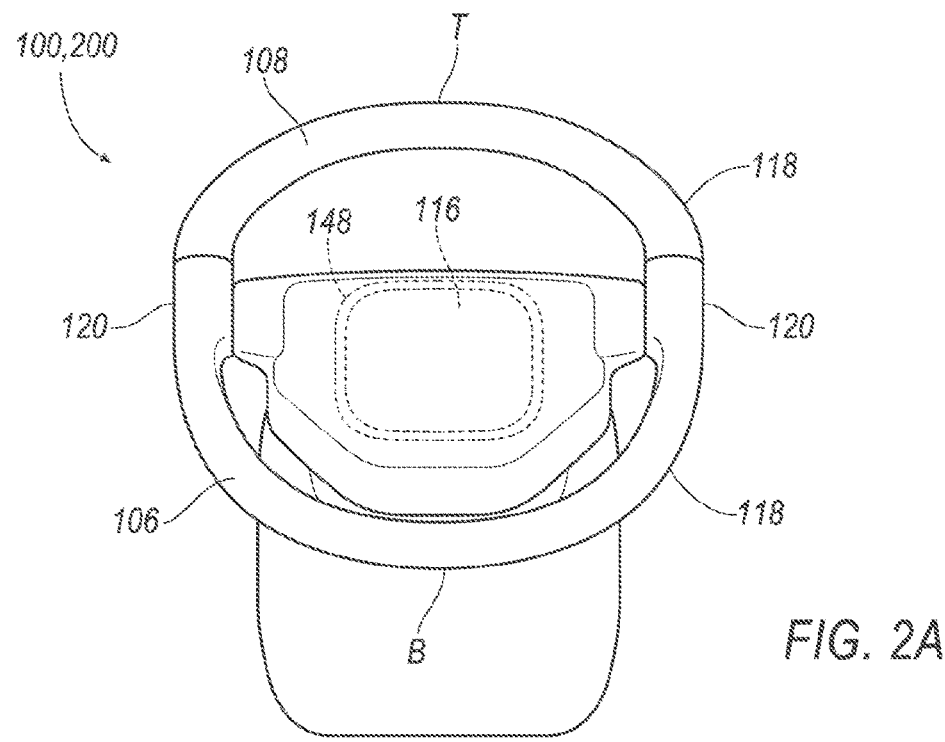
FIG. 2A is a perspective view of the steering wheel.
Figure 2B:
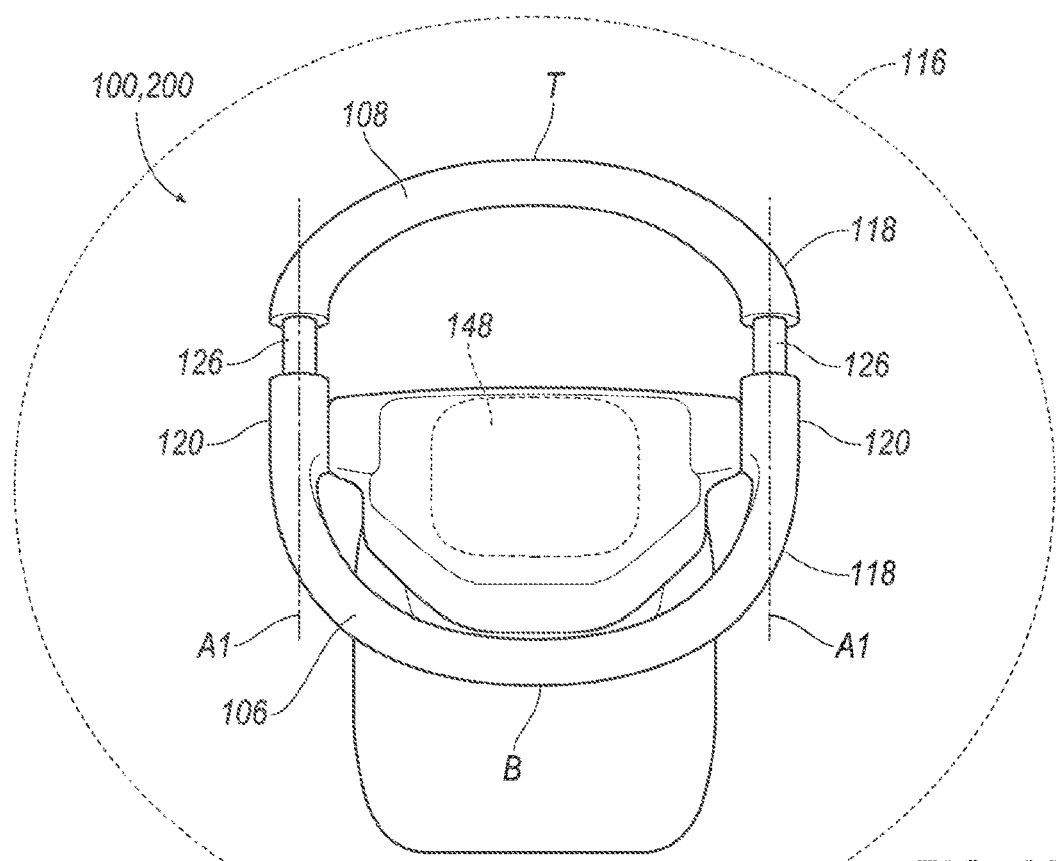
FIG. 2B is a perspective view of the steering wheel in the extended position.

An assembly includes a steering wheel having a first member and a second member supported by the first member, the second member being extendable from the first member from a first position to an extended position. The assembly includes a cylinder in the first member. The assembly includes a piston slidably supported by the cylinder. The assembly includes a pyrotechnic in communication with the cylinder.

The second member may include a telescoping portion slidable within the first member.

The assembly may include a stop positioned to retain the telescoping portion in the first member at the extended position.

The stop may be fixed to the first member.

The piston may abut the second member in the extended position.

The piston may be spaced from the second member in the extended position.

The assembly may include a spring supported by the first member and urging the second member away from the first member.

The cylinder may include a vent.

The assembly may include a frangible member fixing the first member to the second member in the first position.

The frangible member may be fractured when the second member is in the extended position.

The assembly may include an airbag deployable to an inflated position and fixed relative to the steering wheel.

The assembly may include a computer having a processor and a memory storing instructions executable by the processor to, in response to detecting a vehicle impact, actuate the pyrotechnic and deploy the airbag.

The steering wheel may include a rim having a pair of opposing linear portions, the second member extendable from the first member at the linear portions.

An assembly includes a steering wheel having a first member and a second member supported by the first member, the second member being extendable from the first member from a first position to an extended position. The assembly includes a frangible member fixing the first member to the second member in the first position, the frangible member fractured when the second member is in the extended position. The assembly includes a pyrotechnic configured to move the second member to the extended position.

The frangible member may include a necked portion.

The first member may include an interior surface, the necked portion aligned with the interior surface.

The frangible member may include a first portion and a second portion, the necked portion narrower than and between the first portion and the second portion.

The second member may be extendable along a first axis, and the first portion may be spaced from the second portion along a second axis that is perpendicular to the first axis.

The assembly may include an airbag deployable to an inflated position and fixed relative to the steering wheel, and a computer having a processor and a memory storing instructions executable by the processor to, in response to detecting a vehicle impact, actuate the pyrotechnic and deploy the airbag.

The assembly may include a spring supported by the first member and urging the second member toward the extended position.

With reference to the Figures, wherein like numerals indicate like parts throughout the several views, an assembly 100, 200 for a vehicle 102 includes a steering wheel 104 having a first member 106 and a second member 108 supported by the first member 106. The second member 108 is extendable from the first member 106 from a first position to an extended position. The assembly 100, 200 includes a cylinder 110 in the first member 106. The assembly 100, 200 includes a piston 112, 212 slidably supported by the cylinder 110. The assembly 100, 200 includes a pyrotechnic 114 in communication with the cylinder 110.

Actuation of the pyrotechnic 114 moves the second member 108 to the extended position. The second member 108 in the extended position provides a reaction surface for an airbag 116 supported by the steering wheel 104. This allows for, as an example, the steering wheel 104 to be non-circular and also provide the reaction surface for the airbag 116.

The vehicle 102, illustrated in FIGS. 1A-2B and FIG. 5, may be any suitable type of automobile, e.g., a passenger or commercial automobile such as a sedan, a coupe, a truck, a sport utility vehicle, a crossover vehicle, a van, a minivan, a taxi, a bus, etc. The vehicle 102, for example, may be an autonomous vehicle. In other words, the vehicle 102 may be autonomously operated such that the vehicle 102 may be driven without constant attention from a driver, i.e., the vehicle 102 may be self-driving without human input.

The steering wheel 104, illustrated in FIGS. 1A-4B, provides an interface for a driver of the vehicle 102 to control a steering angle of the vehicle 102 by transmitting rotation of the steering wheel 104 to steering movement of wheels of the vehicle, e.g., through a steering rack. The steering wheel 104 includes a rim 118 attached to a steering column that transfers rotation of the steering wheel 104 to steering movement of the wheels. The rim 118 may be grasped by the driver, e.g., permitting the driver to apply torque to the steering wheel 104 to control the steering angle.

The rim may be non-circular. As an example, the rim may be a rounded rectangle, i.e., a rectangle with rounded corners, as shown in the example in the figures. The rim 118 may have a pair of opposing linear portions 120 (illustrated in FIGS. 2A and 2B). The linear portions 120 may be at a right side and a left side of the steering wheel 104 and may be elongated between a top T and a bottom B of the steering wheel 104, e.g., when the steering wheel 104 is oriented such that the steering angle is at or about zero (i.e., such that wheels of the vehicle 102 point straight ahead).

The steering wheel 104 has the first member 106 and the second member 108. Specifically, the rim 118 includes the first member 106 and the second member 108. The second member 108 is supported by the first member 106. Specifically, the first member 106 is supported on the steering column and the first member 106 supports the second member 108 on the steering column.

The first member 106 includes an interior surface 124 defining an interior 122. The interior surface 124 faces inward, e.g., toward a center of the interior 122.

The second member 108 includes a telescoping portion 126 received in the interior 122. The telescoping portion 126 may be elongated along a first axis A1. The telescoping portion 126 may be at the linear portion 120 of the rim 118. The telescoping portion 126 is slidable within the first member 106. The telescoping portion 126 is sized to be slidable in the first member 106. The outer diameter of the telescoping portion 126 is smaller than the diameter of the interior surface 124. The second member 108 may include a lip 128 that stops relative sliding of the telescoping portion 126 and the first member 106, as described further below. The lip 128 may extend outwardly from the telescoping portion 126. The lip 128 may be at a distal end of the telescoping portion 126.

The second member 108 is extendable from the first member 106 from the first position, illustrated in FIGS. 1A, 2A, 3A, and 4A, to the extended position, illustrated in FIGS. 1B, 2B, 3B, and 4B. The second member 108 is extendable along the first axis A1. The second member 108 may be extendable from the first member 106 at the linear portions 120. For example, the telescoping portion 126 of second member 108 may slide relative to the first member 106 along the linear portions 120 from the first position to the extended position. Extending the second member 108 to the extend position increases a distance between the top T and bottom B of the steering wheel 104, e.g., relative to a distance between the top T and bottom B of the steering wheel 104 when the second member 108 is in the first position.

The cylinder 110 defines an enclosed volume 130. The cylinder 110 may be elongated along the first axis A1. The cylinder 110 may be circular in cross section, e.g., taken perpendicular to the first axis A1. Multiple cylinders 110 may be supported by the first member 106, e.g., one each of the linear portions 120. The cylinders 110 may be fixed to the first member 106, e.g., via fastener, etc. The cylinders 110 and the first member 106 may be unitary. Unitary means a single, uniform piece of material with no seams, joints, fasteners, or adhesives holding it together, i.e., formed together simultaneously as a single continuous unit, e.g., by molding, forging, casting, 3-D printing, etc. The cylinders 110 are in the first member 106. For example, the cylinders 110 may be in the interior 122 and surrounded by the interior surface 124.

The cylinder 110 may include a vent 132. The vent 132 provides fluid communication between the volume 130 enclosed by cylinder 110 and the interior 122 of the first member 106, e.g., such that fluid may flow from the volume 130 to the interior 122. For example, the vent 132 may include a pressure release valve that permits fluid pressure within the cylinder 110, e.g., generated by the pyrotechnic 114, to be released into the interior 122 of the first member 106, e.g., when pressure in the cylinder 110 is above a threshold.

The piston 112, 212 is slidably supported by the cylinder 110. The piston 112, 212 is slidable within the volume 130 enclosed by the cylinder 110. For example, the piston 112, 212 may be slidable within the cylinder 110 along the first axis A1. The piston 112, 212 has a cross section that is complimentary to the cross section of the cylinder 110 to seal the piston 112, 212 to the cylinder 110, i.e., such that pressure in the volume 130 enclosed by the cylinder 110 on one side of the piston 112, 212 is restricted from traveling to an opposite side of the piston 112, 212.

The pyrotechnic 114 is combustible to produce a gas, e.g., in response to an ignition command from a computer 134. The pyrotechnic 114 may be formed of a solid mixture of substances that, when ignited, react to produce the gas. For example, the pyrotechnic 114 may be formed of sodium azide (NaNO3), potassium nitrate (KNO3), and silicon dioxide (SiO2), which react to form nitrogen gas (N2). The pyrotechnic 114 is configured to move the second member 108 to the extended position. In other words, gas generated upon ignition of the pyrotechnic 114 moves the second member 108 from the first position to the second position. The pyrotechnic 114 is in fluid communication with the cylinder 110, i.e., such that gas generated upon ignition of the pyrotechnic 114 provides pressure in the volume 130 enclosed by the cylinder 110 on the side of piston 112, 212 opposite the second member 108. For example, the pyrotechnic 114 may be in the cylinder 110 on the side of piston 112, 212 opposite the second member 108. As another example, the pyrotechnic 114 may be in fluid communication with the cylinder, e.g., via tubing or the like. The gas generated by the pyrotechnic 114 may urge the piston 112, 212 along the cylinder 110, e.g., applying force to the second member 108.

The assembly 100, 200 may include a stop 136 that restricts movement of the second member 108 relative to the first member 106. The stop 136 may extend inward from the interior surface 124 of the first member 106. The stop 136 may be fixed to the first member 106. For example, the stop 136 may be fixed to the first member 106 via fastener, weld, etc. As another example, the stop 136 and the first member 106 may be unitary. The stop 136 is positioned to retain the telescoping portion 126 in the first member 106 at the extended position. For example, the stop 136 may be between the lip 128 of the second member 108 and the top T of the steering wheel 104. The lip 128 may abut the stop 136 when the second member 108 is in the extended position.

With reference to FIGS. 3A-4B, the assembly 100, 200 may include one or more frangible members 138 that releasably fix the first member 106 to the second member 108. The frangible member 138 fixes the first member 106 to the second member 108 in the first position, i.e., restricting the second member 108 from extending from the first member 106 to the extended position. The frangible member 138 is frangible relative to the first member 106 and/or the second member 108, as described further below. Fracturing the frangible member 138 permits the second member 108 to extend from the first member 106. In other words, the frangible member 138 is fractured when the second member 108 is in the extended position.

Each of the frangible members 138 may include a necked portion 140. The necked portion 140 is breakable relative to, e.g., a first portion 142 and a second portion 144, of the frangible member 138. To put it another way, the necked portion 140 may have a lower strength, e.g., sheer strength, than the first and second portions 142, 144. Accordingly, the frangible member 138 may fracture at the necked portion 140 when sufficient force is applied to the frangible member 138, while the first portion 142 and the second portion 144 remain intact. The necked portion 140 may be between the first portion 142 and the second portion 144. For example, the first portion 142 may be spaced from the second portion 144 along a second axis A2 that is perpendicular to the first axis A1 with the necked portion 140 therebetween. The necked portion 140 may be narrower than the first portion 142 and the second portion 144. For example, the necked portion 140 may have a cross sectional area that is less than a cross sectional area of the first portion 142 and the second portion 144, e.g., when the cross-sectional areas are taken perpendicular to the second axis A2. The first portion 142 of the frangible member 138 may be fixed to the first member 106, e.g., via fastener, weld, mechanical trapping, etc. For example, the first member 106 define a pocket, and the first portion 142 of the frangible member 138 may be in the pocket. The second portion 144 of the frangible member 138 may be fixed to the second member 108, e.g., via fastener, weld, mechanical trapping, etc. For example, the second member 108 define a pocket, and the second portion 144 of the frangible member 138 may be in the pocket. The necked portion 140 may be aligned with the interior surface 124. For example, the necked portion 140 and the interior surface 124 may be at a same position along the second axis A2.

The frangible member 138 is designed to fracture upon application of a threshold amount of force, e.g., applied to the second portion 144 parallel to the first axis A1. For example, the threshold amount of force may be based on an amount of force is applied to the second portion 144 by the piston 112, 212 when the pyrotechnic 114 is actuated.

Figure 3A:
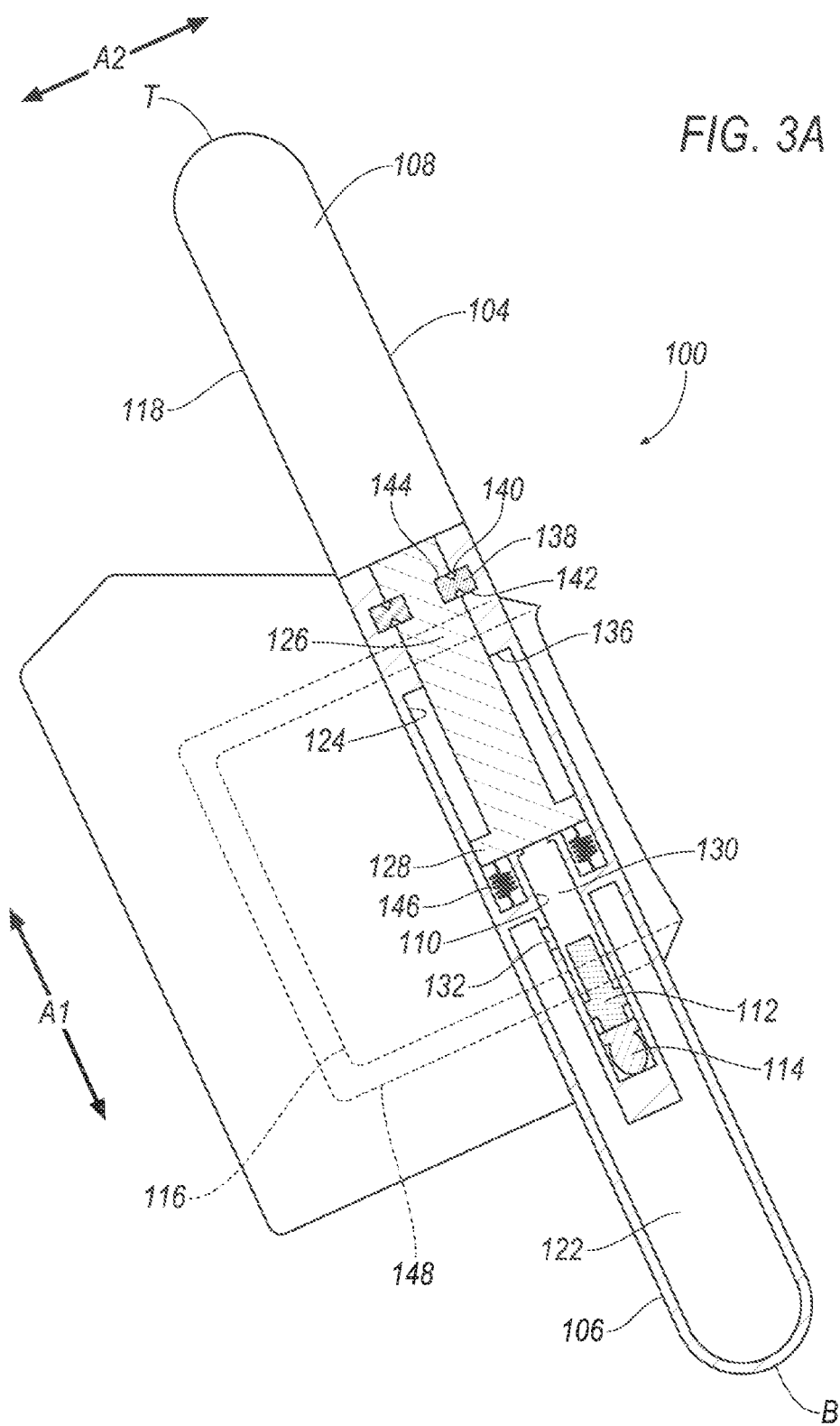
FIG. 3A is a cross section of a steering wheel.
Figure 3B:
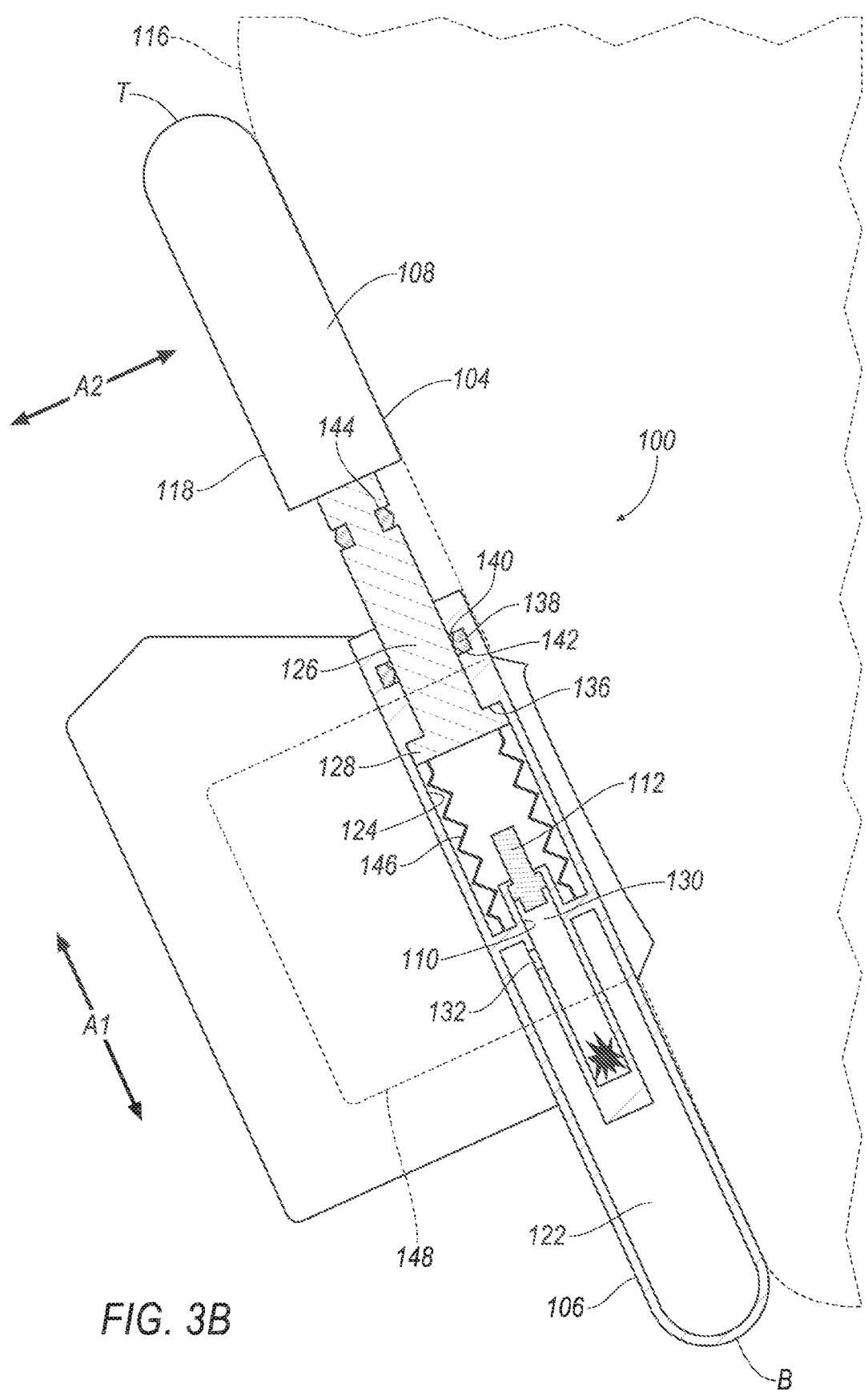
FIG. 3B is a cross section of the steering wheel of FIG. 3A in the extended position.

With reference to FIGS. 3A and 3B, the assembly 100 may include a spring 146, e.g., a coil spring. The spring 146 may be supported by the first member 106, e.g., in the interior 122. The spring 146 urges the second member 108 away from the first member 106, e.g., toward the extended position. For example, the spring 146 may be in compression when the second member 108 is in the first position. The spring 146 may abut the lip 128 of the second member 108. The spring 146 may be between the lip 128 and the bottom B of the steering wheel 104. The spring 146 may urge the second member 108 to the extend position after the frangible member 138 is fractured, e.g., with the piston 112 and pyrotechnic 114. The piston 112 may be spaced from the second member 108 in the extended position, e.g., along the first axis A1. In other words, the spring 146 may urge the second member 108 away from the piston 112 after the pyrotechnic 114 is ignited and the frangible member 138 is fractured.

Figure 4A:
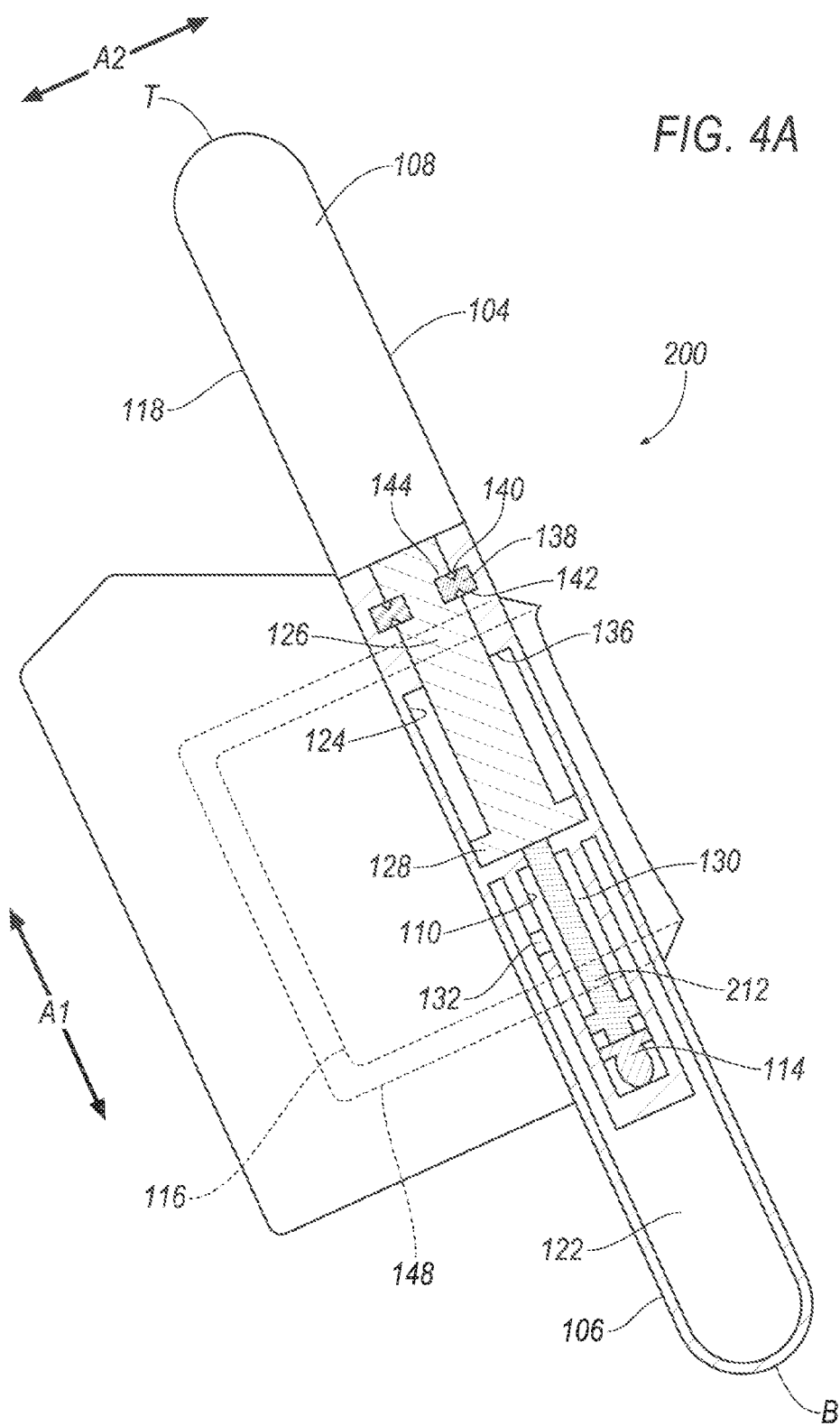
FIG. 4A is a cross section of a steering wheel.
Figure 4B:
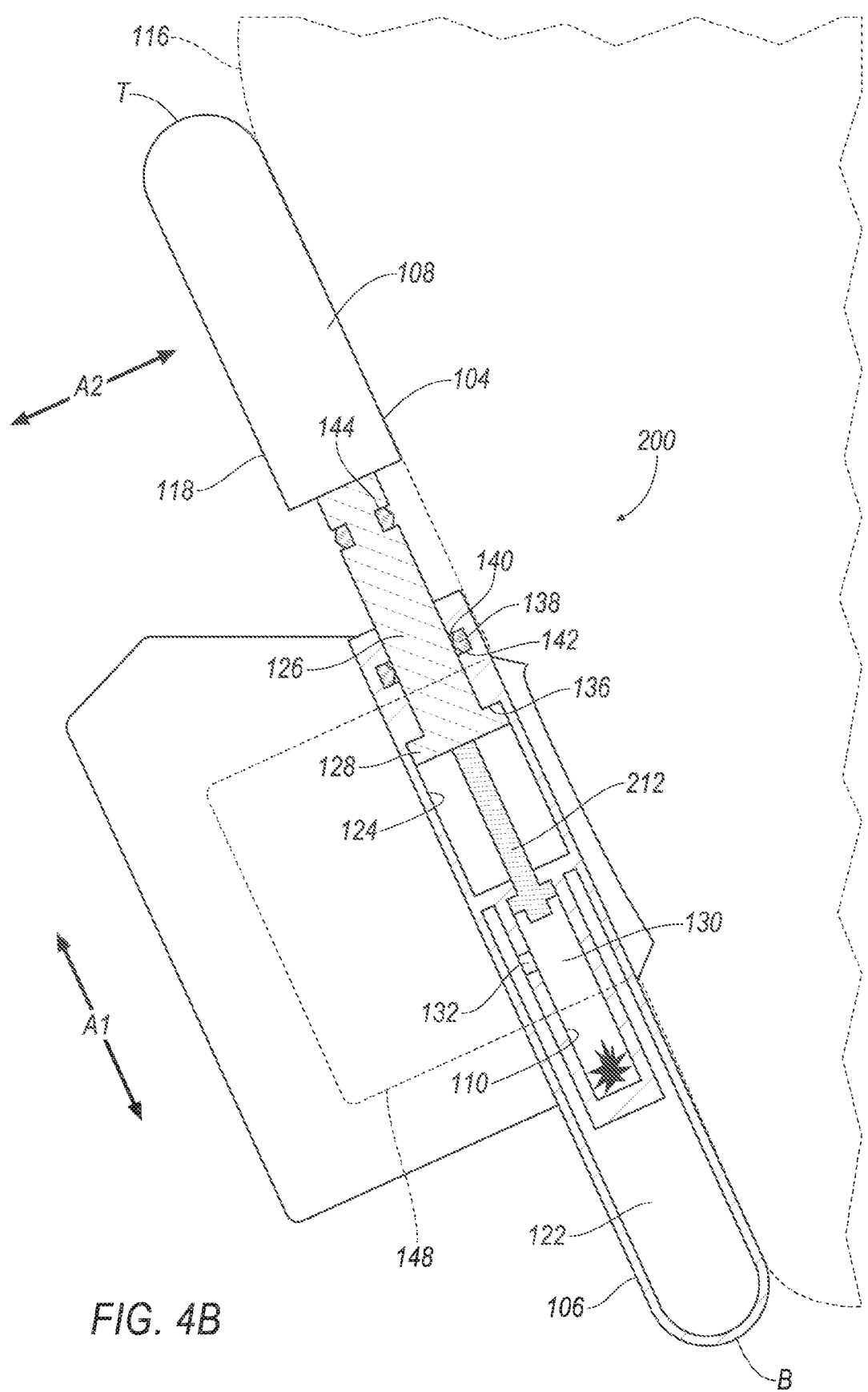
FIG. 4B is a cross section of the steering wheel of FIG. 4A in the extended position.

With reference to FIGS. 4A and 4B, the piston 212 of the assembly 200 may abut the second member 108 in the extended position. For example, the piston 212 may be fixed to the second member 108 such that the piston 212 and the second member 108 move together relative to the first member 106 and the cylinder 110. The piston 212 may be fixed to the second member 108, e.g., to the telescoping portion 126, via fastener, weld, etc. The piston 212 and the second member 108 may be unitary. The assembly 200 may include a spring (not shown) urging the second member 108 to the extended position, e.g., as described for the assembly 100.

Returning to FIGS. 1A-4B, the assembly 100, 200 includes the airbag 116. The airbag 116 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 116 is deployable from an uninflated position, illustrated in FIGS. 1A, 2A, 3A and 4A, to an inflated position, illustrated in FIGS. 1B, 2B, 3B, 4B. The airbag 116 in the inflated position controls kinematics of objects in the vehicle 102, e.g., during an impact to the vehicle 102 such as a front impact. The airbag 116 is fixed relative to the steering wheel 104. For example, the airbag 116 may be supported by a housing 148 fixed to the steering wheel 104. The housing 148 provides a reaction surface for the airbag 116 in the inflated position. The airbag 116 in the uninflated position may be disposed in the housing 148. The housing 148 may be formed of any material, e.g., a rigid polymer, a metal, a composite, etc.

Figure 5:
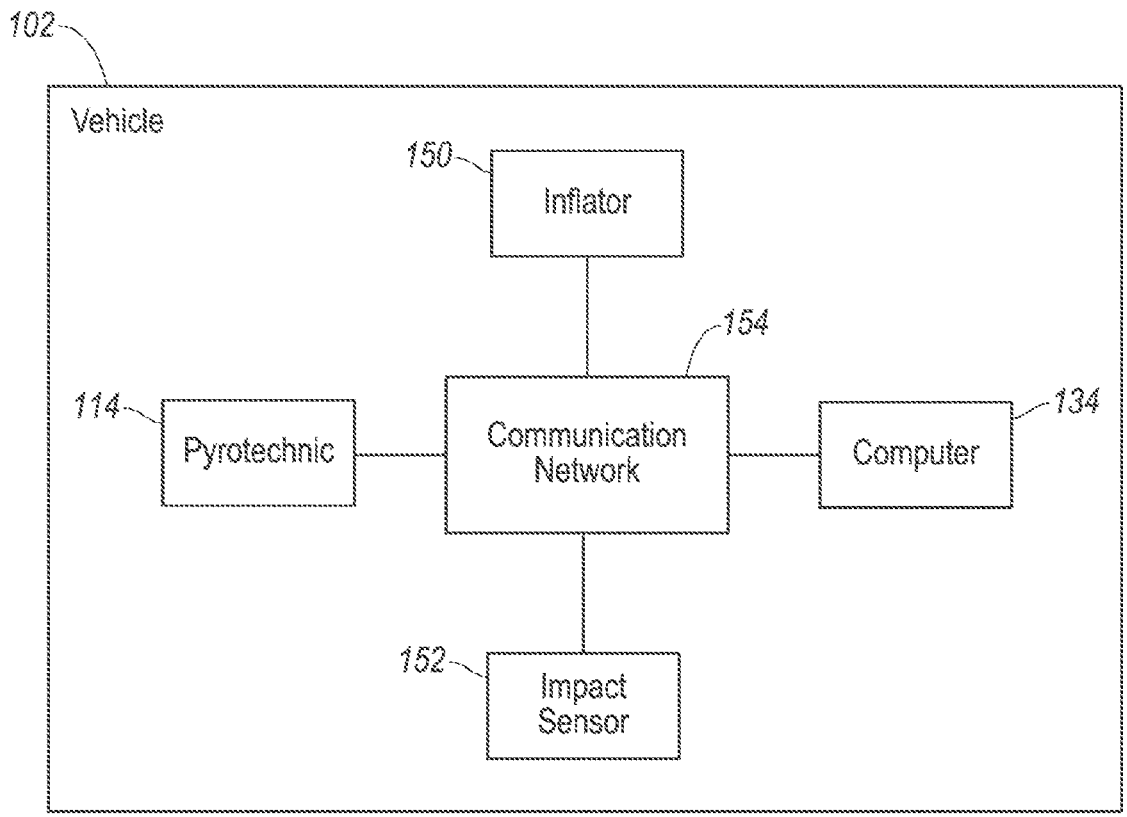
FIG. 5 is a block diagram of components of the vehicle.

With reference to FIG. 5, the inflator 150 may be connected to the airbag 116. Upon receiving a signal from, e.g., the computer 134, the inflator 150 may inflate the airbag 116 with an inflatable medium, such as a gas. The inflator 150 may be, for example, a pyrotechnic inflator that uses a chemical reaction to drive inflation medium to the airbag 116. The inflator 150 may be of any suitable type, for example, a cold-gas inflator. The inflator 150 may be disposed in the housing 148.

The vehicle 102 may include at least one impact sensor 152 for sensing impact of the vehicle 102. The impact sensor 152 is configured to detect an impact to the vehicle 102. The impact sensor 152 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 152 may be located at numerous points in or on the vehicle 102. Alternatively or additionally to sensing impact, the impact sensor 152 may be configured to sense impact prior to impact, i.e., pre-impact sensing.

The computer 134 includes a processor and a memory such as are known. The memory includes one or more forms of computer readable media, and stores instructions executable by the computer 134 for performing various operations, including as disclosed herein. The computer 134 is generally arranged for communications on a vehicle communication network 154 that can include a bus in the vehicle 102 such as a controller area network (CAN) or the like, and/or other wired and/or wireless mechanisms. Via the vehicle communication network 154, the computer 134 may transmit messages to various devices in the vehicle 102, e.g., to the pyrotechnic 114, the inflator 150, etc., and/or receive messages (e.g., CAN messages) from the various devices, e.g., form the impact sensor 152.

The computer 134 is programmed to, i.e., the memory stores instructions executable by the processor to, deploy the airbag 116. For example, the computer 134 may transmit a command, e.g., an impulse, to the inflator 150 via the communication network 154. The computer 134 is further programmer to actuate the pyrotechnic 114 to move the second member 108 to the second position. For example, the computer 134 may transmit a command, e.g., an impulse, to the pyrotechnic 114 via the communication network 154. The computer 134 may deploy the airbag 116 and actuate the pyrotechnic 114 in response to detecting a vehicle impact. For example, the impact sensor 152 may sense an impact to the vehicle 102 and transmit a message specifying such impact via the communication network 154 to the computer 134. Upon receiving such message, the computer 134 may transmit actuation commands via the communication network 154 to the inflator 150 and the pyrotechnic 114 to deploy the airbag 116 and move the second member 108 to the second position. The commands may be timed such that the second member 108 is in the extended position before the airbag 116 is in the inflated position. The second member 108 in the extended position provides a reaction surface to the airbag 116 in the inflated position, e.g., to support the airbag 116 in the inflated position and control kinematics of an object in the vehicle 102.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
    a steering wheel having a first member and a second member supported by the first member, the second member being extendable from the first member from a first position to an extended position;
    a cylinder in the first member;
    a piston slidably supported by the cylinder; and
    a pyrotechnic in communication with the cylinder.

2. The assembly of claim 1, wherein the second member includes a telescoping portion slidable within the first member.

3. The assembly of claim 2, further comprising a stop positioned to retain the telescoping portion in the first member at the extended position.

4. The assembly of claim 3, wherein the stop is fixed to the first member.

5. The assembly of claim 1, wherein the piston abuts the second member in the extended position.

6. The assembly of claim 1, wherein the piston is spaced from the second member in the extended position.

7. The assembly of claim 1, further comprising a spring supported by the first member and urging the second member away from the first member.

8. The assembly of claim 1, wherein the cylinder includes a vent.

9. The assembly of claim 1, further comprising a frangible member fixing the first member to the second member in the first position.

10. The assembly of claim 9, wherein the frangible member is fractured when the second member is in the extended position.

11. The assembly of claim 1, further comprising an airbag deployable to an inflated position and fixed relative to the steering wheel.

12. The assembly of claim 11, further comprising a computer having a processor and a memory storing instructions executable by the processor to, in response to detecting a vehicle impact, actuate the pyrotechnic and deploy the airbag.

13. The assembly of claim 1, wherein the steering wheel includes a rim having a pair of opposing linear portions, the second member extendable from the first member at the linear portions.

14. An assembly, comprising:
    a steering wheel having a first member and a second member supported by the first member, the second member being extendable from the first member from a first position to an extended position;
    a frangible member fixing the first member to the second member in the first position, the frangible member fractured when the second member is in the extended position; and
    a pyrotechnic configured to move the second member to the extended position.

15. The assembly of claim 14, wherein the frangible member includes a necked portion.

16. The assembly of claim 15, wherein the first member includes an interior surface, the necked portion aligned with the interior surface.

17. The assembly of claim 15, wherein the frangible member includes a first portion and a second portion, the necked portion narrower than and between the first portion and the second portion.

18. The assembly of claim 17, wherein the second member is extendable along a first axis, and the first portion is spaced from the second portion along a second axis that is perpendicular to the first axis.

19. The assembly of claim 14, further comprising an airbag deployable to an inflated position and fixed relative to the steering wheel, and a computer having a processor and a memory storing instructions executable by the processor to, in response to detecting a vehicle impact, actuate the pyrotechnic and deploy the airbag.

20. The assembly of claim 14, further comprising a spring supported by the first member and urging the second member toward the extended position.

* * * * *